United States Patent [19]
Römer

[11] Patent Number: 5,337,785
[45] Date of Patent: Aug. 16, 1994

[54] VALVE

[75] Inventor: Joachim C. Römer, Strasslach, Fed. Rep. of Germany

[73] Assignee: AVS Ing. J.C. Roemer GmbH, Strasslach, Fed. Rep. of Germany

[21] Appl. No.: 88,479

[22] Filed: Jul. 7, 1993

[30] Foreign Application Priority Data

Jul. 9, 1992 [DE] Fed. Rep. of Germany ....... 4222594

[51] Int. Cl.$^5$ .................. F16K 11/10; F16K 7/07; F16K 7/12; F16K 31/06
[52] U.S. Cl. .................. 137/625.65; 137/625.44; 137/596.17; 251/5; 251/30.05; 251/129.07; 251/129.17; 251/129.2; 251/331
[58] Field of Search ............ 137/625.44, 625.65, 137/596.17, 863, 870; 251/5, 30.01, 30.05, 129.07, 129.17, 129.2, 281, 282, 283, 331

[56] References Cited

U.S. PATENT DOCUMENTS

| | | | |
|---|---|---|---|
| 2,874,924 | 2/1959 | Good | 251/281 X |
| 3,118,646 | 1/1964 | Markey | 251/5 |
| 3,683,962 | 8/1972 | Good | 137/870 X |
| 3,790,127 | 2/1974 | Reip | 251/129.2 |
| 4,645,174 | 2/1987 | Hicks | 251/5 |
| 4,925,153 | 5/1990 | Römer | 251/30.01 |
| 5,027,857 | 7/1991 | Champseix | 251/331 X |
| 5,035,259 | 7/1991 | Allen et al. | 251/5 X |

FOREIGN PATENT DOCUMENTS

| | | |
|---|---|---|
| 0341340 | 11/1989 | European Pat. Off. . |
| 7324333 | 9/1973 | Fed. Rep. of Germany . |
| 2546393C2 | 4/1976 | Fed. Rep. of Germany . |
| 3334158C1 | 1/1985 | Fed. Rep. of Germany . |
| 3334159A1 | 4/1985 | Fed. Rep. of Germany . |
| 3334160A1 | 4/1985 | Fed. Rep. of Germany . |
| 3335487 | 6/1976 | U.S.S.R. . |

Primary Examiner—John Rivell
Attorney, Agent, or Firm—Townsend and Townsend Khourie and Crew

[57] ABSTRACT

The valve comprises a valve housing (39) and a valve member (28) which is tiltably arranged in the housing about a tilt axis (30) and which serves to close or free valve openings arranged on opposite sides of the tilt axis (30) in a flow passage leading from an inlet (46) to an outlet (48). The pressures which prevail in operation at the valve openings exert tilting moments on the valve member, and means (120, 138, 133; 122, 136, 133) arranged on both sides of the tilt axis are provided which exert compensating tilting moments on the valve member (28), with the said tilting moments and compensation tilting moments at least substantially cancelling one another in all positions of the valve member. An actuating device (12) is provided which controls the valve member and causes the valve member to execute a tilting movement. Both the valve openings (58) and also the compensation means (120, 138, 133; 122, 136, 133) are arranged so that they lie at least substantially in one plane, which brings considerable manufacturing and technical advantages.

22 Claims, 5 Drawing Sheets

VALVE

FIELD OF INVENTION

The present invention relates to a valve, comprising a valve housing, a valve member which is tiltably arranged in the housing about a tilt axis and which serves to close or free valve openings arranged on opposite sides of the tilt axis in a flow passage leading from an inlet to an outlet, with the pressures which prevail in operation at the valve openings exerting tilting moments on the valve member, and further comprising means arranged on both sides of the tilt axis which exert compensating tilting moments on the valve member, with the said tilting moments and compensation tilting moments at least substantially cancelling one another in all positions of the valve member, and also comprising an actuating device which controls the valve member and causes the valve member to execute a tilting movement.

BACKGROUND OF THE INVENTION AND DISCUSSION OF THE PRIOR ART

A solenoid valve of this kind is known from DE-OS 33 34 158. Similar solenoid valves are also known from DE-OS 33 34 159 and from DE-OS 33 34 160.

In these known solenoid valves the valve member has an approximately T-shaped form with a central limb and two lateral arms. The limb is provided at both sides with a yielding, preferably resilient, closing element which, depending on the state of excitation of the electromagnet which actuates the valve member, selectively closes off one of two valve openings of the valve housing which are arranged on opposite sides of the limb, are spaced from and face one another. Each valve opening communicates with a lateral opening which opens beneath a respective arm of the T-shaped valve member and the transmission members which form the compensation means.

If it is assumed that the limb of the valve member closes one of the valve openings then the pressure at this opening exerts a first turning moment on the valve member. Since this opening communicates with a lateral opening, arranged beneath the arm of the valve member arranged on the same side of the tilt axis in the same pressure as acts at the closed valve opening, brings about a tilting moment on the valve member which opposes the first turning moment. Through corresponding layout of the lever arm and of the opening cross-sections one succeeds in making the two tilting moments of the same size so that they cancel one another. In this state, the other valve opening is open. However, corresponding conditions prevail at this side of the valve member so that the two tilting moments also essentially cancel one another here.

The limb is located in a communication space between the two oppositely disposed valve openings, with this communicating space belonging to the valve passage. This means, that in this embodiment the flow passage extends from the inlet of the valve to the first valve opening, through the ring space and through the second valve opening to the outlet of the valve. If the valve member is moved out of the closed position in which the first valve opening is closed while the second valve opening is opened into a middle position in which the valve member neither closes the first opening, nor the second opening then a flow through the valve is possible. It is also possible to generate a further connection from the outside to the ring space. In this way a 3/2-way valve is provided. The possibility also exists of allowing the second valve opening to be closed by the limb. In this case a communication is present between the inlet side of the valve and the ring space, or a consumer connected to this ring space, a communication to the consumer attached to the outlet of the valve is however interrupted.

The advantage of an arrangement of this kind lies in particular in the fact that the actuating force which is required to tilt the valve member from one switching position to the other switching position is largely independent of the operating pressures since the pressures which prevail in operation always lead to tilting moments which are compensated for. Thus the actuation means essentially only has to overcome friction and to supply the deformation work for the membrane that is used. The actuating force can thus be kept very small, which leads to a compact construction of the electromagnet (solenoid).

In the apparatus known from DE-OS 33 34 158 the transmission members are formed as cylindrical pins which slide in lateral bores and extend through respective ring seals so that the pressures prevailing in the respective bores are transmitted to the arms of the T-shaped valve member. Somewhat problematic with this arrangement is the fact that the frictional effect between the bore and the pins can have disadvantageous effects with the level of the friction which arises changing in operation, for example as a result of mechanical wear on the one hand and jamming on the other hand, and the fact that the seals that are used can lead in the course of time to leakages. The proposal is admittedly contained in DE-OS 33 34 158 that the pistons, i.e. the pins which represent the transfer members of the compensation means can also be replaced by bellows or membrane systems, i.e. when seal friction is undesirable. Nevertheless, the construction of all of the solenoid valves named in the three documents is relatively complicated and problems also arise in that the valve housing has to be split into two and indeed about a central longitudinal axis so that costly manufacturing processes have to be used in order to achieve a good seal between these two housing halves. This two-part construction is however necessary in the named documents in order to ensure precise machining of the valve openings which face one another.

OBJECTS OF THE INVENTION

The principal object of the present invention is to so design a valve of the initially named kind that an extremely compact construction is obtained which is easy to realise from the point of view of its manufacture, with the friction which has to be overcome by the actuating means being minimised so that in this case one can also operate with small actuating forces.

Furthermore, the valve of the invention should in particular be suitable for actuation by an electromagnet (solenoid) with, however, other actuating devices also being straightforwardly usable. For example, the valve of the invention can serve to change over a hydraulic or pneumatic drive, for example in such a way that an abutment mounted on a piston of the drive actuates the valve of the invention and hereby changes over or reverses the drive.

BRIEF DESCRIPTION OF THE INVENTION

In order to satisfy these objects it is proposed, in accordance with the invention, that both the valve openings and also the compensation means should lie in one plane.

The fact that one can in this way succeed in compensating the tilting moments which act on the valve member is initially surprising.

A simple possibility for obtaining this compensation is achieved in that the compensation means comprise a first means arranged at the outlet side of the valve and acted on by the pressure at the inlet side of the valve and also of a second means arranged at the inlet side of the valve and acted on by the pressure at the outlet side of the valve. The arrangement with the valve openings and also the compensation means in one plane leads, as is evident from the subsequent description, to substantial manufacturing advantages. The pressure loading of the compensation means at the outlet side with the pressure prevailing at the inlet side and vice versa can be elegantly solved, i.e. realised. An advantage of the valve openings and compensation means arranged in one plane lies in the fact that the valve seats which surround the valve openings and also the bores which serve to receive the compensation means, or former compensation means, can all be machined from one side and are all readily accessible. Furthermore, a single membrane suffices in order to seal the parts of the valve housing and to ensure an effective separation between the working fluid and the actuating part of the valve.

In a particularly preferred embodiment the valve consists of a lower housing part which contains the outlet opening, the flow passage, the valve openings and the compensation means, and of a membrane which covers over the valve openings and the compensation means, and also of an upper housing part which holds the membrane against the lower housing part, which contains the valve member and which defines the tilt axis. In this embodiment the membrane can in particular be of disc-like shape and cost-favourably stamped from sheet material. The membrane can however also be moulded with advantage as a injection moulded part, in particular when it is desired to form certain beads or other features on the membrane, which is however not absolutely essential.

With this design the membrane forms a complete separation between the lower part of the housing through which flow takes place and the upper "actuating" part of the housing containing the valve member. As the actuating part of the housing is sealed off from the working medium, the clogging of this part with the working medium, or with contamination contained in the working medium, need not be feared. Moreover, liquid or moisture which is present in the lower part of the housing through which flow takes place, does not penetrate into the actuating part, or into an actuating device attached to the latter, for example in the form of an electromagnet. The compensation means are preferably formed by openings which open beneath the membrane and which under the action of pressure bring about a deformation of the membrane in the region of the opening and press the latter against the valve member. In this way, one succeeds, by means of simple openings, in achieving the desired function while avoiding relatively complicated transfer means, such as pins, pistons or the like. However, in the solution of the invention, transmission elements or pins can be used in accordance with the invention if this should be desired for a specific reason. It is also not absolutely essential that the membrane covers over such pins or transmission elements when the latter are provided with their own seals. A membrane which covers over the compensation means and the valve openings is, however, the preferred solution.

On forming the compensation means by openings which are provided beneath the membrane the openings should have cross-sectional areas which take account of the forces required for the deformation of the membrane.

In accordance with a particularly preferred embodiment the valve openings and also the requisite openings for the compensation means are formed in a valve plate which is insertable in the lower part of the housing. The corresponding valve plate can be machined from both sides and can also be realised as an injection moulded part in a technical plastic. In the latter case, machining of the valve plate is then no longer necessary.

The flow connections from the inlet side to the first compensation means at the outlet side and from the outlet side to the second compensation means at the inlet side can be formed in the lower side of the valve plate. In this arrangement they can have the form of downwardly open passages with the final shape of the passages closed on all sides being achieved by the upper side of the lower housing part.

A further possibility of manufacturing these flow connections lies in forming them in a plate or disc insertable beneath the membrane in the lower part of the housing, with the disc or plate preferably being inserted between the valve plate and the upper side of the lower housing part. As the disc can be manufactured of softer material than the valve plate, it serves as it were a seal between the valve plate and the lower part of the housing so that leakages via the said flow connections to the compensation means need not be feared.

The valve member is preferably itself of an approximately disc-like shape and has downwardly projecting spigots which are arranged above valve openings. On closing of the respective openings, the respective spigot presses the membrane against the valve seat formed around the valve opening.

The valve member can also have further downwardly projecting spigots which come to lie above the compensation openings. The compensating tilting moments are transmitted through the pressures lying at the compensation openings via the membrane and the corresponding spigots to the valve member.

An arrangement in which the upper part of the housing has an approximately circular mounting recess for the disc-like valve member is particularly favourable. This circular recess should be crossed at the bottom by a bridge part, or by a transverse wall, with openings being formed in the transverse wall for the spigots in order to enable the co-operation of the valve member with the membrane, or with the compensation means.

The transverse wall then also serves to restrict the possibility of movement of the membrane and holds the latter against the valve plate. When the valve plate has a central opening then an upwardly projecting support can be provided starting from the transverse wall which supports the tilt axis in the central region.

If, for example, the tilt axis is formed by a pin then the latter should extend over a diameter of the disc-like valve member and should be supported at its ends and at its middle part in mounts at opposite sides of the housing part and in the support respectively. The mounts can be formed by upwardly open notches, with the pin which forms the tilt axis being held by a plate of an actuating device securable to the upper part of the housing. In similar manner, the valve member, which is preferably circular in plan view, can have mounts on both sides of the supports for the tilt axis.

The actuating means can be an electromagnetic actuating means, in particular an electromagnetic actuating means of the kind set forth in German patent application P 42 21 112.3, with this actuating means pressing a thrust member against the one arm of the valve member. A spring is preferably provided for resetting the valve member and acts on the other arm of the valve member. The thrust pin of the electromagnet can be formed with advantage by a ball. In this way, bearing balls of high quality, but of favourable price, can be used.

The flow passage of the valve expediently leads from the inlet through the first valve opening, through a space formed between the first valve opening and the second valve opening and then through the second valve opening to the outlet side. It is particularly favourable if a further connection is provided to said space. In this way, the function of a 3/2-way valve can be achieved straightforwardly.

The valve of the invention also serves as a pilot valve for a membrane valve, in particular for a membrane valve in accordance with the European patent application with the publication number 0 341 340.

A particularly preferred combination of the valve of the invention with a membrane valve can be seen from claim 22.

LIST OF FIGURES

The invention will now be explained in more detail in the following with reference to embodiments and to the drawing in which are shown:

FIG. 1 a schematic longitudinal cross-section through a valve in accordance with the invention in the closed position, FIG. 2 a longitudinal cross-section through the valve of FIG. 1, but in the open position, FIG. 3A to 3G schematic sketches to explain the manner of operation of the valve in accordance with the invention as shown in FIGS. 1 and 2, FIG. 4 an exploded perspective illustration of the components of the valve of FIGS. 1 and 2, to more precisely explain the construction of this valve, and FIG. 5 a schematic longitudinal cross-section through a valve in accordance with the invention which is here used as a pilot valve for a membrane valve in accordance with the European patent 0 341 340.

DESCRIPTION OF PREFERRED EMBODIMENTS

Figure 1:
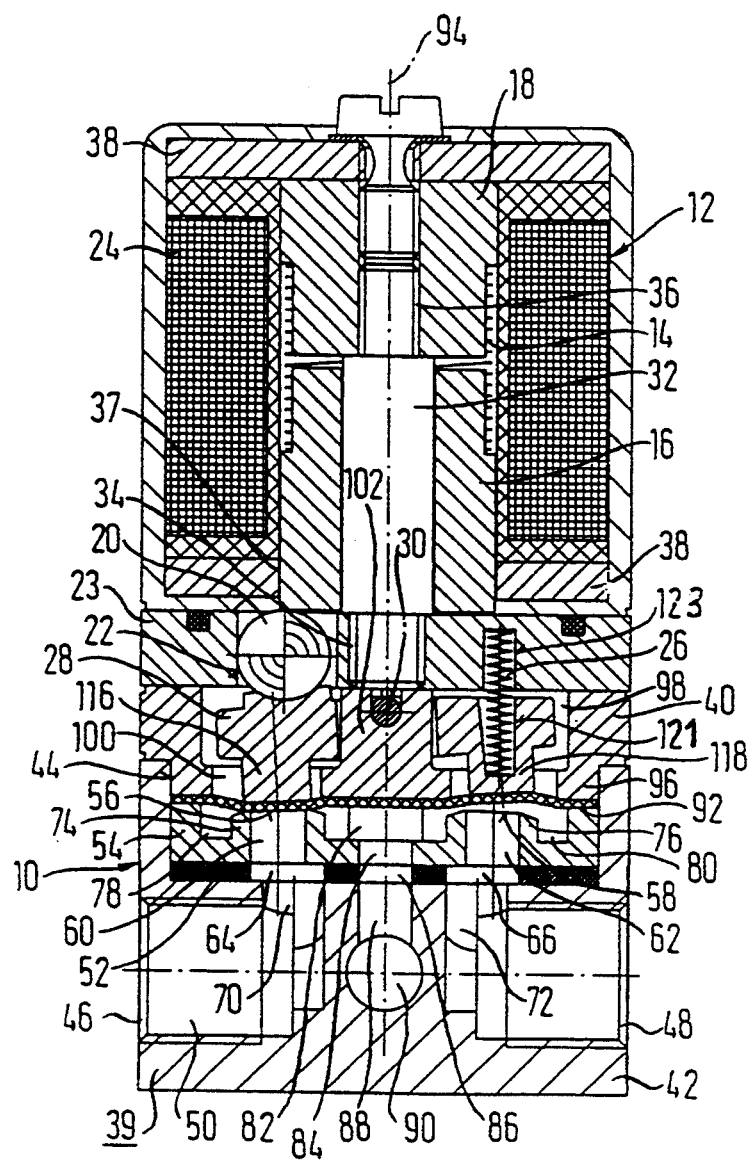

FIG. 1 shows a valve 10 of the kind of the invention which is actuated by an electromagnet 12. The electromagnet 12 is preferably designed as described in the German patent application P 42 21 112.3 (Attorney's file reference: A 3561). Other electromagnets and other actuating devices can also be used. It is important for the electromagnet 12 that in the current free state, the spring 14 presses the solenoid armature 16 downwardly away from the fixed armature counterpiece 18 so that the solenoid armature 16 presses a ball 20, which is guided in a bore 22 of a lower plate or holder 23 of the electromagnet, downwardly into the position shown in FIG. 1. If the electromagnet is exited by a current flowing through the coil 24 then the solenoid armature 16 is drawn against the force of the spring 14 against the fixed armature counterpiece 18, so that the ball is no longer loaded. As will be subsequently explained in more detail, a resetting spring 26 can tilt a valve member 28, formed as a tilting lever, about the tilt axis 30 into another switching position, whereby the ball 20 is pressed upwardly.

Of significance with respect to the electromagnet 12 is in particular the centrally arranged guide 32 which is screwed into the holder 23 at the lower end by means of a thread 34 and is threaded at the upper end by means of a further thread 36 into the armature counterpiece 18. Through this centrally arranged guide, one succeeds in operating with the smallest possible air gap 37 between the movable solenoid armature and the magnetic return path 38 of iron, with the efficiency of the electromagnet being particularly favourable, so that it can be made very small for a specific actuating force.

Figure 2:
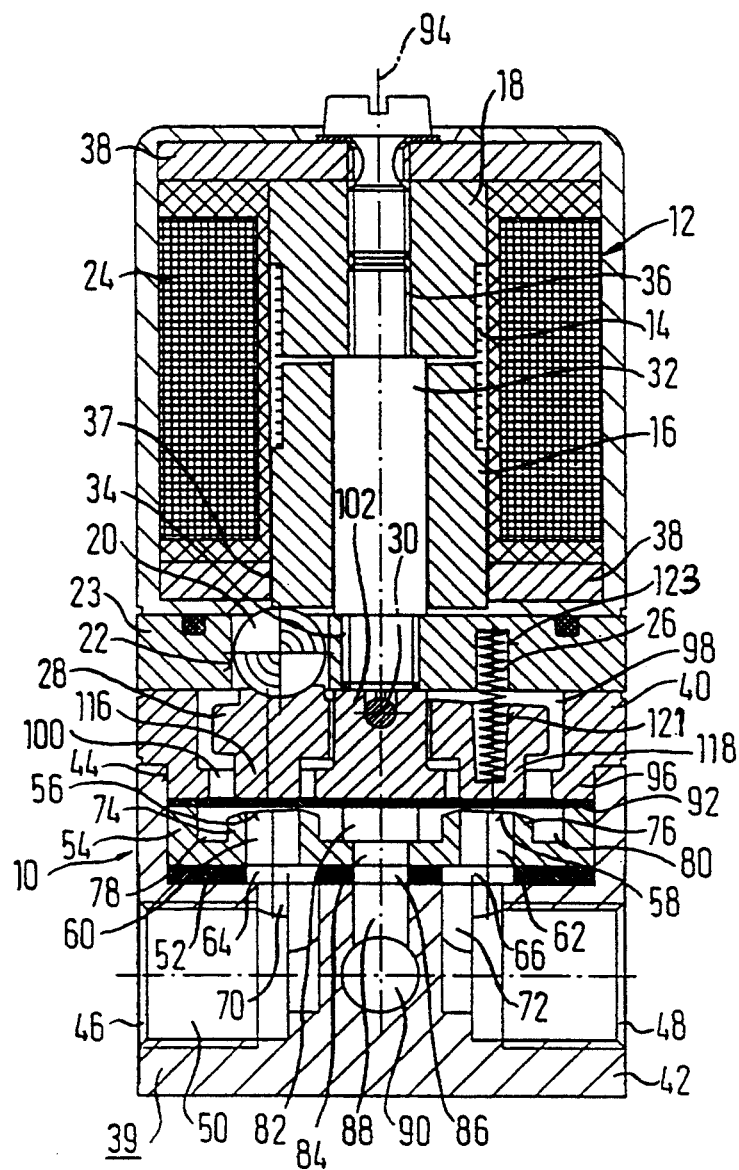

The actual fluid valve 10 of FIGS. 1 and 2 has a housing 39 with upper and lower parts 40 and 42. The lower housing part 42 is, as can also be seen from FIG. 4, square in plan view and has a cylinder-shaped mounting opening or recess 44 in the upper side.

In the base region of the lower housing part 42 there is located an inlet 46 and an outlet 48 which are formed as threaded bores and lie opposite to one another. The inlet communicates with the outlet 48 via a flow passage 50 which is partly formed in the lower housing part 42 and partly in two further components which are used in the mounting opening 44. These two further components comprise on the one hand a disc 52 having flow passages and on the other hand a valve plate 54 which is likewise approximately disc-shaped. This valve plate 54 has two valve openings 56 and 58 which are aligned via vertically extending bores 60 and 62 respectively, with corresponding openings 64 and 66 of the disc 52 and perpendicular bores 70 and 72 of the lower housing part 42, with the bores 70 and 72 intersecting the threaded bores forming the inlet 46 and the outlet 48.

Figure 4:
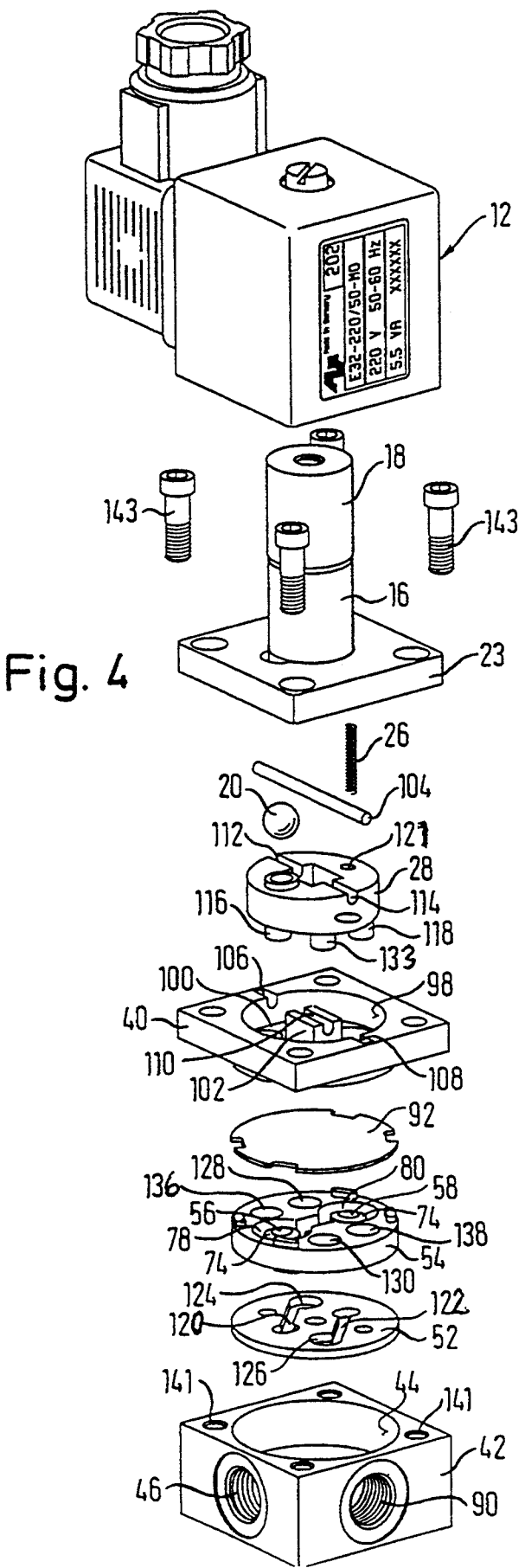

The valve openings 56 and 58 of the valve plate 54 are formed at the upper edge by parts 74 and 76 of the valve plate 54 having the shape of short tubes, with these tubular parts 74 and 76 being arranged in respective approximately cylindrical openings 78 and 80 of the valve plate 54. These cylinder-shaped openings 78 and 80 are connected to one another via a connection passage 82. This connection passage 82, which can be seen both in FIGS. 1 and 2 and also in FIG. 4, is furthermore connected via a vertical bore 84 of the valve plate 54, a vertically arranged bore 86 of the disc 52 and a vertically arranged bore 88 of the lower housing part 42 with a further outlet bore 90. The further bore 90, which is in particular visible in FIG. 4, can used as an additional inlet or outlet and can be formed in accordance with the inlet 46 and the outlet 48 as a threaded bore. 4. The bore 90 can however also be closed with a plug and does not have to provided at all.

From FIGS. 1 and 2 one can see that the valve openings or the upper edges of the tubular parts 74, 76 are somewhat chamfered in order to facilitate the cooperation with a membrane 92 which lies above the openings, or with the valve member 28 which lies above it.

The membrane 92 which is of essentially disc-like shape (as can be seen from FIG. 4) is held between the lower edge of the upper housing part 40 and the upper edge of the valve plate 54, and indeed between respective cylindrical shaped regions which are arranged at the wall of the cylindrical recess 44. The cylindrical recess 44 of the lower housing part 42 thus serves not only to centre the disc 52 and the valve plate 54 so that these lie coaxial to the central longitudinal axis 94 of the valve, but rather also centres the upper housing part 40 which is likewise arranged concentric to the central longitudinal axis 94 of the valve. This latter centring takes place via the ring shoulder 96 of the upper housing part 40 which fits into the cylindrical recess 44.

The upper housing part 40 also has an approximately cylindrical recess or space 98 which is bounded at its lower end by a transverse wall 100 having openings. In the central region of the cylindrical shaped recess 98 there is located a support 102 which is carried by the transverse wall 100. The previously mentioned valve member 28 which is formed as a two-armed tilting lever fits within the recess 98 as can best be seen from FIGS. 1 and 2. A pin 104 (FIG. 4) serves as a tilting axis 30 for the valve member 28. As can best be seen from FIG. 4, the ends of the pin 104 fit in respective mounts 106 and 108 of the upper housing 40, with the mounts 106 and 108 being upwardly open and lying diametrically opposite to one another. The support 102 likewise has an upwardly open mount 110 which supports the central region of the pin 104 forming the tilt axis. The valve member 28 which is circular in plan view also has two upwardly open diametrically oppositely disposed mounts 112 and 114 which likewise receive the tilting axle 104, and indeed in the region between the mount 106 and the mount 100 and between the mount 100 and the mount 108.

As can be seen from FIGS. 1 and 2, the valve member 28 has two cylindrical spigots 116 and 118 which lie opposite to the valve openings 56 and 58 with the membrane 92 being inserted therebetween.

Above the spigot-like valve projection 116 at the side of the valve member 28 remote from the projection there is located the ball 20 which acts as the valve thrust element. At the other side of the tilt axis the valve spring 26 extends partially within a bore 121 formed in the spigot-like projection 118 and partly within a bore 123 which is formed in the holder or plate 23 and is aligned with the bore 121.

The basic operation of the valve can now be briefly explained with respect to FIGS. 1 and 2. In the position shown in FIG. 1, the electromagnet 12 is current-free, i.e. not energised, and the spring 14 presses the magnetic armature 16 downwardly so that the latter likewise presses the ball 20 downwardly and the ball holds the valve member 28 in the inclined position shown in FIG. 1 by contact therewith. The spigot-like valve projection 116 then holds the membrane against the ring edge surrounding the valve opening 56 so that the valve opening is closed. In this way a flow through the passage 50 from the inlet 46 to the outlet 48 is prevented. A throughflow from the inlet 90 into the outlet 48 is however possible or however also in the opposite direction, providing the inlet/outlet 90 as provided and is not closed.

If the electromagnet 12, which is formed in this example as a proportional magnet is excited, but only with about half the full excitation current, the movable solenoid armature is drawn upwardly somewhat, i.e. in the direction of the armature counter element 18, and the force of the spring 26 is sufficient in order to bring the valve member 28 into the horizontal position which can be seen in FIG. 2. In this position, the membrane 92 touches neither the ring-like edge surrounding the valve opening 56 nor the ring-like edge surrounding the valve opening 58 so that a flow from the inlet to the outlet is possible, and indeed via the bore 70, the opening 64 and the bore 60, through the valve opening 56, through the passage 82, through the valve opening 58 and via the bore 62, the opening 66 and the bore 72 into the outlet 48. If the connection 90 is provided and is likewise connected to a consumer then a part of the flow is likewise led to this consumer connected to the outlet 90. Moreover, flows in other directions are possible. For example, the connection 90 can be declared an inlet, the inlet 46 can then be made the outlet and one can now obtain, via the inlet 90, flows through the inlet 46 which now functions as an outlet and through the outlet 48 which still functions as an outlet.

If the electromagnet is fully excited, then the movable armature 16 is fully drawn in, i.e. it comes into contact with the armature counterpiece 18 so that the ball 20 is completely relieved and the force of the spring 26 is sufficient to tilt the valve member 28 in the clockwise direction. In this way, the spigot-like valve projection 118 presses the membrane 92 against the ring-like edge surrounding the valve opening 58 so that through-flow from the inlet 46 to the outlet 48 is now not possible. If, however, the inlet 90 is used as an outlet then a flow could take place from the inlet 46 into the outlet 90.

If one considers the valve in the state shown in FIG. 1, then it is clear that the valve member 28 does not appear to be compensated moment-wise. The inlet pressure acts over the surface of the ring-like opening 56 on the valve member 28 and causes a tilting moment in the clockwise direction. The pressure at the outlet side 48 which is lower ultimately operates only on the surface of the spigot-like projection 118 on the valve member 28 and causes a tilting moment in the counter-clockwise sense. Since the lever arms are of the same size and the pressure on the inlet side is customarily considerably higher then at the outlet side, a relatively large force of the spring 14 will be necessary in order to keep the valve member 28 in the illustrated position, particularly since the tilting moment originating from the spring 26 must also be compensated for.

The valve is however so laid out that compensation moments act on the valve member 28 which ensure that the tilting moments which operate on the valve member 28 in operation as a result of the pressures prevailing in operation, are at least substantially compensated for in all working positions. This means that the electromagnet can be made very small, since it now only has to supply the force which is required to move the valve member against the prevailing frictional and (small) spring forces.

The way in which this compensation of the tilting moments originating from the operating pressures is achieved, will now be explained in more detail.

As can be seen from FIG. 4 the disc 52 has connection passages 120, 122 to further openings 124 and 126 which cannot be seen in FIGS. 1 and 2. These openings 124 and 126 are aligned with perpendicular bores 128 and 130 of the valve plate 54 so that the pressure which prevails at the inlet side 46 acts via the passage 120, the opening 124 and the bore 128 at the outlet side on the membrane, whereas the pressure which prevails at the outlet side of the valve acts via the passage 122, the opening 126 and the bore 130 on the membrane at the inlet side. Above the membrane on the valve member 28 there are located further projections 133 (only one of these projections is visible in FIG. 4) which stand opposite to the bores 130 and 132 which transfer the forces acting on the membrane 92 to the valve member 28. In other words, as a result of the pressures prevailing in the bores 128 and 130, compensating tilting moments act on the valve member 28 so that the latter can be fully compensated tilting-momentwise through corresponding layout of the size of the openings 128, 130. The bores 128, 130 thus form compensating means together with the associated projections 133.

Figure 3:
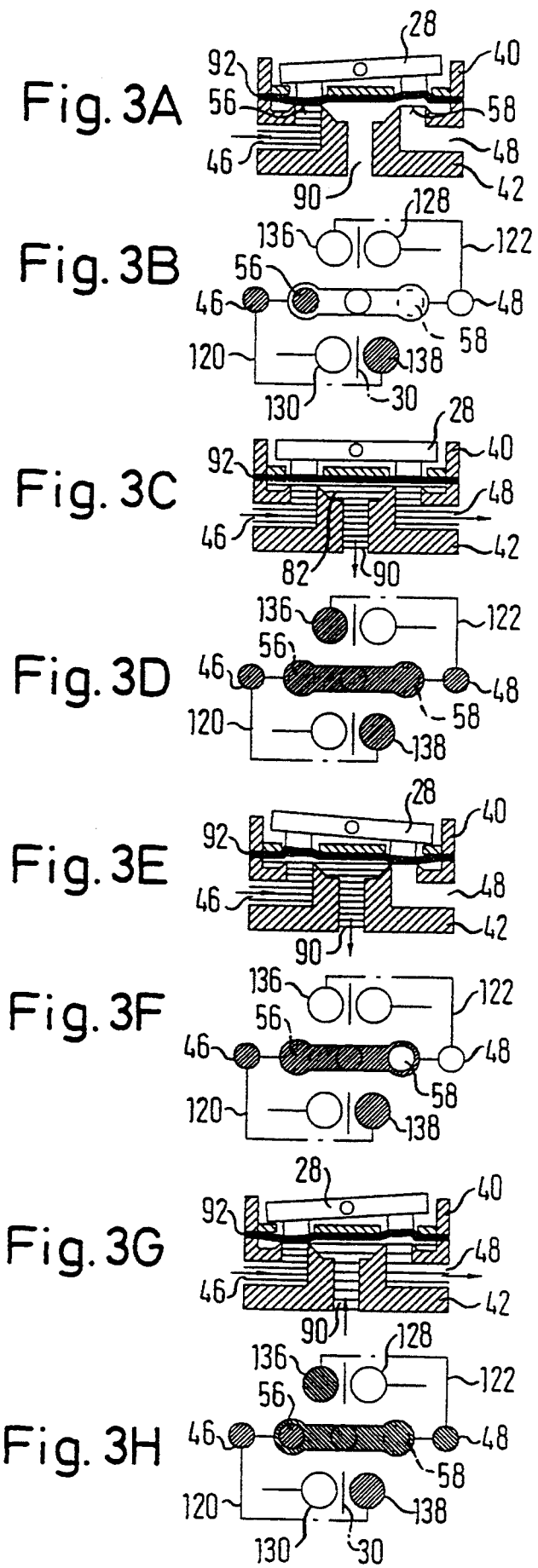

In addition to the bores 128, 130 two further bores 136 and 138 can be provided in the valve plate 54 which can be used as compensation openings in place of the openings 128 and 130. This is for example possible when the disc 52 is inserted into the housing turned to 90° relative to the drawing of FIG. 4. This will then lead to an arrangement as is sketched in FIG. 3.

FIG. 4 also shows how in this example the electromagnet 12 is secured to the valve 10 via four in the screws 143 which penetrate the corners of the holder 23 and also the corners of the housing part 40 and can be screwed into threaded bores 141 of the lower part of the housing 42 and simultaneously hold the valve 10 together.

The manner of operation of the valve will now be explained one again in the following with regard to the FIGS. 3A to 3H.

The FIG. 3A shows schematically the valve of FIG. 1, the valve member 28 in the position shown in FIG. 1. One notes that the valve opening 56 is closed, in contrast the valve opening 58 is open. The electromagnet is current-free, i.e. the actuating moment which originates from the spring 14 is larger than the resetting moment of the spring 26.

As the bore 138 communicates with the input side of the valve via the passage 120, a tilting moment is generated there on the valve member 28 which compensates for the tilting moment generated by the input side pressure. One notes that the cross-section of the opening 138 is larger than the cross-section of the valve opening 56. Through this increased surface account is taken of the fact that the force generated by the bore 138 acts on a shorter moment arm related to the tilting axis 30 than the force generated by the opening 56. Through the different layouts of the sizes of the openings 56 and 138, account can also be taken of the fact that a part of the forces generated by the respective openings are required for the deformation of the membrane.

In corresponding manner, the pressure which prevails at the outlet side is fed-in via the passage 122 into the bore 136 so that here a full moment compensation also prevails, precisely as was mentioned for the pressure side. The output pressure admittedly prevails also in the passage 82, it can however not exert any tilting moment onto the valve member 28, or rather it exerts equally sized tilting moments, but in opposite directions on the valve member 28, so these tilting moments can be ignored because they cancel each other.

The openings 128 and 130 are not used in this rotary position of the disc 52. They could however be formed, by the provision of further openings in the disc 52 and in the housing part 42, or by the provision of further spigots on the valve member 28, into additional control openings, for example in order to enable remote control from the outside.

In the state, or in the switch position of FIGS. 3A and 3B, the valve is fully compensated apart from the actuating moment of the spring 14 and the oppositely directed resetting moment of the spring 26 (assuming that one ignores the weight force of the movable armature).

FIG. 3C shows then the circumstances when the valve member 28 adopts the position of FIG. 2. As can be seen from FIG. 3D, the moments generated by the pressures originating from the input side or from the output side are also compensated for in precisely the same manner as in the position of the valve member of FIG. 3A. The pressure in the passage 82 also has no role to play here as was likewise justified above. In this state, the valve is thus also compensated in the manner explained above, and indeed here also with respect to the actuating moment and the resetting moment.

FIG. 3E shows then the position of of the valve member 28 in which the valve opening 58 is closed, but in contrast the valve opening 56 is opened. That is to say, the electromagnet is fully excited or drawn-in and the spring 26 presses the right hand side of the valve member downwardly. One notes that a flow from the inlet 46 to the outlet 90 is possible, the flow connection from the inlet 46 to the outlet 48 is however interrupted. The conditions now prevail which are shown in FIG. 3F, i.e. in this case the tilting moments which act on the valve member 28 as a result of the operating pressures are fully compensated for.

Finally, FIG. 3G shows the same position of the valve as in FIG. 3A, but now under the assumption that the inlet 90 is charged with pressure fluid so that this flows from the inlet 90 to the outlet 48, i.e. that pressure built up in the connection 90 is reduced through a flow to the outlet 48.

The pressures which prevail in the state of FIG. 3G also leads to a complete compensation of the tilting moments acting on the valve member 28 as is shown by FIG. 3H. The valves are also compensated with this manner of operation (apart from the actuating moment and the resetting moment).

Figure 5:
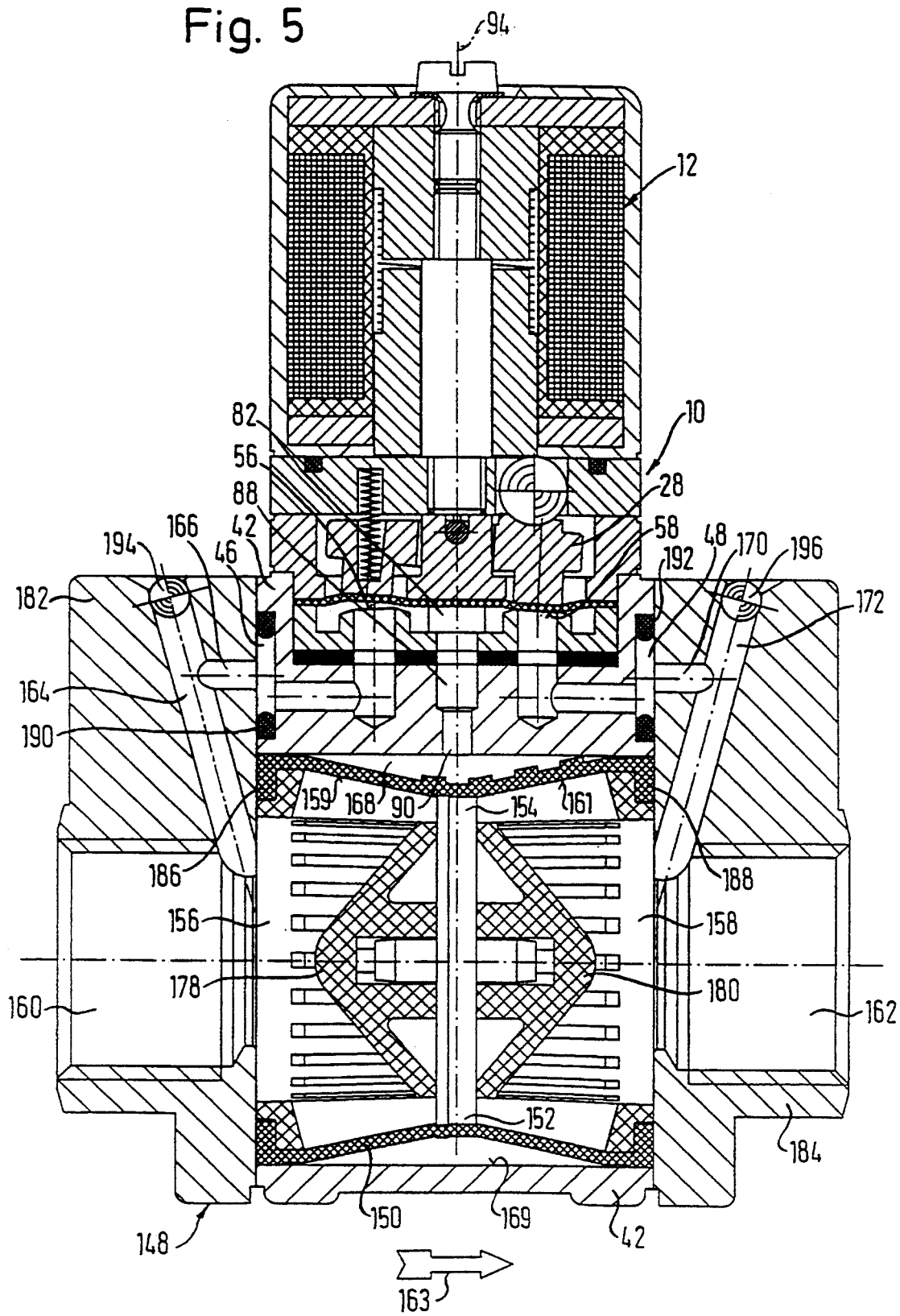

FIG. 5 finally shows the valve 148 of the previous Figures as a pilot valve mounted on a membrane valve in accordance with the European patent application publication no. 0 341 340. Only the lower part of the housing 42 is somewhat differently shaped then shown in the previous Figures.

The membrane valve in accordance with the European patent application, publication no. 0 341 340 as shown here in FIG. 5, has an approximately hose-like membrane 150 which contacts a ring-like valve seat 152 in the illustrated position of the valve. The ring-like seat 152 represents the outer circumference of a partition wall 154 which is carried by two slotted cylinder-like parts 156 and 158. The membrane valve has two connections 160, 162 which normally function as the inlet 160 and the outlet 162. That is to say, the flow through the housing takes place in the direction of the arrow 164.

In the illustrated position of FIG. 5 the membrane valve is closed, since the ring-like membrane 150 contacts the ring seat 152. The reason for this lies in the fact that the pressure prevailing in the inlet 160 passes via the bore 164, the bore 166 and also the bores of the valve 10 of the invention into the passage 82 and then via the central bore 88 and also the connection opening 90 into the ring space 168 which is formed around the hose-like membrane 150 between the latter and the lower part of the housing 42. In this example the lower part 42 of the housing is provided beneath the inlet and outlet openings 46, 48 with a cylinder-like bore 169 which receives the hose-like membrane and also the bodies 156 and 158 and the partition wall 154. The pressure at the inlet side thus holds the membrane 150 against the partition wall 154, the membrane valve is thus closed.

The valve 10 is now controlled so that it adopts a position, as shown in FIG. 2, with both valve openings 56 and 58 being opened (not shown in FIG. 5). The pressure prevailing in the ring chamber 168 now dies away so that the pressure fluid can now flow away via the connection opening 90, the bore 88, the passage 82, the opening 56, the outlet 48, the further bore 170 and also the bore 170 to the outlet 162 of the membrane valve.

The pressure which prevails at the input side in the input 160 now lifts the membrane 150 from the ring seat 152 and the pressure fluid present at the input 160 now flows radially outwardly through the slots of the tubular part 156, through the chamber which is now formed between the inner side of the hose-like membrane and the parts 156, 158 (chamber not shown in FIG. 5) over the ring seat 152 and radially inwardly through the slots of the tubular valve 158 to the outlet 162. These parts 178 and 180 represent the flow cones which improve the flow behaviour in the membrane valve. As can be read in the European Patent application, the membrane 150 is preferably made somewhat longer than the axial length of the surfaces 159, 161 of the parts 156 and 158 with partition wall which support it, in order to hereby obtain a gentle noiseless closing behaviour.

For the sake of completeness, it is pointed out that the membrane valve 148 consists, in addition to the parts 150, 154, 156, 158 contained in the cylinder bore 169 of the lower part of the pilot valve 10, of an input part 182 and an output part 184 which are pressed by means of throughgoing screws (now shown in FIG. 5) against oppositely disposed end faces of the housing part 42. The bores 164, 166 and 170, 172 are provided in the inlet part 182 and in the outlet part 184 respectively. The sealing takes place via the ring flanges 186, 188 at the axial ends of the hose-like membrane 154. Additional seals are provided between the input part 182 and the inlet 46 and between the outlet part 184 and the outlet 48 by 0-ring seals 190, 192 provided in corresponding ring recesses. In other respects it is evident from FIG. 5 that the electromagnet 12 and the valve member 28 have been built-in turned through 180° relative to the embodiment of FIGS. 1 and 2, which does not however have any significance for the operation. Apart from the fact that the closed position of FIG. 5 is achieved in the currentless state of the electromagnet, instead of in the excited state of the latter. The reference numerals 194 and 196 represent two balls which serve to close the open ends of the bores 164 and 172.

With the design shown in FIG. 5, very small actuating forces from electromagnets 12 can be exploited to actuate the pilot valve 10 and this can in turn control a membrane valve which is laid out for much greater flows. It is particularly favourable that with this design no pronounced restrictions are necessary in the bores 164, 166, 170, 172 and are also not present in the pilot valve 10, so that a functional disturbance as a result of contamination or blocking of the flow passages at restrictors is precluded, because such restrictors are missing.

In all embodiments a rapid changeover of the valve is possible not least because the valve member is of small size and thus has small inertia.

I claim:

1. A valve, comprising a valve housing, a valve member which is tiltably arranged in the housing about a tilt axis and which serves to close or free valve openings arranged on opposite sides of the tilt axis in a flow passage leading from an inlet to an outlet, with the pressures which prevail in operation at the valve openings exerting tilting moments on the valve member, and further comprising means arranged on both sides of the tilt axis which exert compensating tilting moments on the valve member, with the said tilting moments and compensation tilting moments at least substantially cancelling one another in all positions of the valve member, and also comprising an actuating device which controls the valve member and causes the valve member to execute a tilting movement, wherein both the valve openings and also the compensation means lie at least substantially in one plane.

2. Valve in accordance with claim 1, wherein the compensation means comprise a first compensation means arranged at the outlet side of the valve and acted on by the pressure at the inlet side of the valve and also of a second compensation means arranged at the inlet side of the valve and acted on by the pressure at the outlet side of the valve.

3. Valve in accordance with claim 1, wherein it comprises a lower housing part which contains the inlet opening, the outlet opening, the flow passage, the valve openings and the compensation means and a membrane which covers over the valve openings and the compensation means, as well as an upper housing part which holds the membrane against the lower housing part, contains the valve member and determines the tilt axis.

4. Valve in accordance with claim 3, wherein the membrane is of disc-like shape.

5. Valve in accordance with claim 3, wherein said compensation means act through compensation openings which open beneath the membrane, which bring about a deformation of a membrane in the region of the openings through the action of pressure and press the membrane directly against the valve member.

6. Valve in accordance with claim 5, wherein the openings forming the compensation means have cross-sectional areas which take account of the forces required for the deformation of the membrane.

7. Valve in accordance with claim 1, wherein the compensation means are formed by piston-like pins.

8. Valve in accordance with claim 3, wherein the valve openings and also the required openings for the compensation means are formed in a valve plate insertable into the lower part of the housing.

9. Valve in accordance with claim 8, wherein flow connections from the inlet side to the first compensation means and from the outlet to the second compensation means are formed beneath the valve plate in the latter.

10. Valve in accordance with claim 8, wherein flow connections from the inlet side to the first compensation means and from the outlet side to the second compensation means are formed by corresponding passages in a disc which is insertable into a second part of the housing beneath the membrane.

11. Valve in accordance with claim 5, wherein the valve member is an approximately disc-like shape and has downwardly projecting spigots which are arranged above the valve openings and on closing of the respective valve openings press the membrane against valve seats formed around the respective valve openings.

12. Valve in accordance with claim 11, wherein the valve member has further downwardly projecting spigots which are arranged above said compensation openings.

13. Valve in accordance with claim 11, wherein the upper part of the housing has an approximately circular mounting recess for the disc-like valve member, with the mounting recess being closed off at the bottom of a transverse wall which has openings for the spigots in order to enable the cooperation of the valve member with the membrane, or with the compensation means respectively, with the transverse wall restricting the possibilities of movement of the membrane and holding the latter against a valve plate.

14. Valve in accordance with claim 13, wherein the valve member has a central opening through which a support which projects upwardly from the transverse wall projects; and in that the tilt axis is formed by a pin which extends over a diameter of the disc-like valve member and is supported at its ends, or at its central region, in respective mounts of the housing upper part, with the mounts being formed by upwardly open notches and the pin being held in the mounts by a plate of an actuating device securable at the upper housing part.

15. Valve in accordance with claim 14, wherein the valve member has mounts on both sides of the support for the pin defining the tilt axis.

16. Valve in accordance with claim 1, wherein the actuating device is an electromagnetic actuating device, with this device pressing a thrust member against an arm of the valve member.

17. Valve in accordance with claim 16, wherein a resetting device, in particular a resetting spring, acts on an other arm of the valve member.

18. Valve in accordance with claim 16, wherein the thrust member is formed by a ball.

19. Valve in accordance with claim 1, wherein the flow passage leads from the inlet, through a first valve opening, through a space formed between the first valve opening and a second valve opening and then through the second valve opening to the outlet.

20. Valve in accordance with claim 19, wherein a further connection is provided to said space.

21. Valve in accordance with claim 1, wherein it serves as a pilot valve for a membrane valve.

22. Valve in accordance with claim 21, wherein the membrane valve contains a hose-like membrane which is provided inside a cylinder bore of a lower housing part, is supported by inner support bodies, and cooperates with a valve seat formed by a transverse partition wall carried by the support bodies, with a ring space being provided between the hose-like membrane and the cylinder bore of the lower housing part which accommodates the membrane; and in that, depending on the position of the pilot valve, the membrane is either acted on by the pressure prevailing at an inlet side, with the membrane contacting the valve seat of the partition wall, or is relieved to an outlet side whereby the hose-like membrane lifts from the partition wall, as a result of the pressure prevailing at the input side and enables flow through the membrane valve from the inlet, through openings provided in the support body, over the partition wall and through openings provided in the support body to the outlet.

* * * * *